United States Patent
Gschwind (10) Patent No.: US 9,810,119 B2
(45) Date of Patent: Nov. 7, 2017

(54) MIXER FOR AFTERTREATMENT OF EXHAUST GASES

(71) Applicant: Eberspacher catem GmbH & Co. KG, Herxheim (DE)

(72) Inventor: Thomas Gschwind, Bad Durkheim (DE)

(73) Assignee: Eberspacher catem GmbH & Co. KG, Herxheim (DE)

( * ) Notice: Subject to any disclaimer, the term of this patent is extended or adjusted under 35 U.S.C. 154(b) by 154 days.

(21) Appl. No.: 14/650,398

(22) PCT Filed: Sep. 25, 2013

(86) PCT No.: PCT/EP2013/002878
§ 371 (c)(1),
(2) Date: Jun. 8, 2015

(87) PCT Pub. No.: WO2014/086440
PCT Pub. Date: Jun. 12, 2014

(65) Prior Publication Data
US 2015/0315943 A1    Nov. 5, 2015

(30) Foreign Application Priority Data
Dec. 7, 2012   (DE) .................... 20 2012 011 764 U (51) Int. Cl.
*F01N 3/10*       (2006.01)
*B01F 3/04*       (2006.01)
(Continued)

(52) U.S. Cl.
CPC ........... *F01N 3/10* (2013.01); *B01D 53/9431* (2013.01); *B01F 3/04007* (2013.01);
(Continued)

(58) Field of Classification Search
None
See application file for complete search history.

(56) References Cited

U.S. PATENT DOCUMENTS

2008/0047260 A1    2/2008  Kapsos et al.
2008/0308083 A1*  12/2008  Wirth ................... B01F 3/04049
                                                                    123/592

FOREIGN PATENT DOCUMENTS

DE     10 2005 063 081 A1    7/2007
DE        102005063081 A1 *  7/2007   .......... B01F 3/04049
(Continued)

OTHER PUBLICATIONS

Meingast et al. DE102005063081A1—translated document (2007).*

*Primary Examiner* — Walter D Griffin
*Assistant Examiner* — Jelitza Perez
(74) *Attorney, Agent, or Firm* — Boyle Fredrickson, S.C.

(57) ABSTRACT

The invention relates to a mixer for a device for selective catalytic reduction of exhaust gases from internal combustion engines. The mixer comprises a structure of mixer elements through which the mixture of exhaust gas and reducing agent is to flow. The mixer elements have an electric current flowing through them for electrical heating due to the electrical resistance thereof. The invention further relates to a device for selective catalytic reaction of exhaust gases from an internal combustion engine having an exhaust gas pipe leading to a mixer according to the invention and having a reducing agent pipe which is connected to a reservoir for reducing agent and which opens into the exhaust gas pipe in the flow direction upstream of the mixer, and a catalyst in the flow direction downstream of the mixer.

17 Claims, 4 Drawing Sheets

(51) Int. Cl.
- *B01F 7/00* (2006.01)
- *B01D 53/94* (2006.01)
- *F01N 3/08* (2006.01)
- *F01N 3/20* (2006.01)
- *F01N 3/28* (2006.01)
- *B01F 5/06* (2006.01)
- *B01F 15/06* (2006.01)

(52) U.S. Cl.
CPC ........ *B01F 3/04049* (2013.01); *B01F 5/0616* (2013.01); *B01F 7/0025* (2013.01); *B01F 7/00033* (2013.01); *B01F 15/066* (2013.01); *F01N 3/0892* (2013.01); *F01N 3/2066* (2013.01); *F01N 3/2892* (2013.01); *B01F 2005/0639* (2013.01); *B01F 2015/062* (2013.01); *B01F 2215/0036* (2013.01); *F01N 2240/16* (2013.01); *F01N 2240/20* (2013.01); *F01N 2610/02* (2013.01); *F01N 2610/102* (2013.01); *Y02T 10/24* (2013.01)

(56) References Cited

FOREIGN PATENT DOCUMENTS

| | | |
|---|---|---|
| EP | 0 894 523 A1 | 2/1999 |
| FR | 2 900 439 A3 | 11/2007 |

\* cited by examiner

MIXER FOR AFTERTREATMENT OF EXHAUST GASES

BACKGROUND OF THE INVENTION

1. Field of the Invention

The present invention relates to a mixer for a device for selective catalytic reduction of exhaust gases from internal combustion engines. The present invention in particular relates to a mixer which serves uniform distribution of a reducing agent that is introduced into the exhaust gas stream.

2. Discussion of the Related Art

During fuel combustion in an internal combustion engine (e.g. a diesel or gasoline engine), undesirable by-products are produced, inter alia, nitrogen oxides ($NO_x$). It is in the interest of keeping the air clean desirable to reduce the $NO_x$ content in the exhaust gas. One method known for this is so-called Selective Catalytic Reduction (abbreviated SCR). This is a technique for reducing nitrogen oxides in exhaust gases, in particular from engines. In SCR, a chemical reaction occurs on a catalyst (SCR catalyst). Metal oxide mixtures (for example, titanium dioxide, vanadium pentoxide and tungsten dioxide) or zeolites (H-zeolites), or also mixtures of metal oxides with zeolite are suitable as catalysts for SCR.

For having the catalytic reaction take place, ammonia (NH3) is required which must be supplied to the exhaust gas in a suitable form. The products of the reaction are water ($H_2O$) and nitrogen ($N_2$). The chemical reaction at the SCR catalyst is selective, that is to say, preferably the nitrogen oxides (NO, $NO_2$) are reduced, while undesirable side reactions (such as the oxidation of sulfur dioxide to sulfur trioxide) are largely suppressed.

Since ammonia is under the prevailing physical conditions in an internal combustion engine present in gaseous state, it is fed to the location of selective catalytic reduction preferably indirectly in the form of an aqueous urea solution (known by the name AdBlue). It can—unlike gaseous ammonia—simply be carried along in an additional tank in the vehicle. When using an aqueous urea solution for supplying the reducing agent, one makes use of the fact that urea can in a thermolytic hydrolytic reaction be decomposed in several steps to ammonia (and carbon dioxide). For having such a decomposition reaction take place in an optimal manner, sufficiently high temperatures (preferably above 200° C., more preferably at least approx 350° C.) are required. The hydrolysis step is preferably further catalytically supported.

Further details regarding SCR and obtaining ammonia by decomposition of urea supplied in an aqueous solution as Ad Blue are described, for example, in European patent application EP 2 325 452 A1.

For the catalytic reactions to take place in an optimal manner, it is necessary to distribute the aqueous urea solution and the ammonia formed from this solution at the catalyst inlet as uniformly as possible in the exhaust gas stream and across the catalyst surface. This results in a high degree of efficiency for the $NO_x$ reduction. The distribution is strongly influenced by the design and geometry of the exhaust systems. To improve distribution (for achieving the most approximate stoichiometric uniform distribution of nitrogen oxides and ammonia at the catalyst inlet) additional mixers are generally used to enhance treatment and distribution of the mixture of exhaust gases and reducing agent supplied in the SCR catalyst.

It is a drawback of known exhaust gas and mixer systems, that solid urea or unwanted intermediates (for example, cyanuric acid, melamine or other solid deposits) are deposited—to a varying degree depending on the geometry used in the thermal decomposition of urea. In particular at the beginning of engine operation (after starting the engine), as long as the exhaust gas temperatures are still low, deposit of urea on the mixer elements (blades) of the mixer occurs because the water component of AdBlue evaporates and residues remain on the blades. The melting point of dry urea is at 132° C. The lower the exhaust gas temperatures, the more unwanted solid deposits form. The exhaust gas temperatures are additionally reduced by the injection of cold AdBlue. It is desirable to avoid such deposits. In addition, the SCR reaction itself requires very high exhaust gas temperatures. The exhaust gas temperatures of diesel engines are during start-up and coasting operations so low that $NO_x$ conversion in the SCR catalyst can not occur.

SUMMARY OF THE INVENTION

It is an object of the present invention to provide an improved mixer for a device for catalytic reduction of exhaust gases from internal combustion engines that overcomes the drawbacks described above, and in particular avoids the formation of deposits and enables reduction of existing deposits during operation, respectively. The present invention further seeks to provide a device for catalytic reduction of exhaust gases.

To satisfy the above object, a mixer having the features of claim 1 is specified with the present invention. Furthermore, a device is specified by independent claim 15 for selective catalytic reduction of exhaust gases which comprises the mixer according to the invention.

A mixer is according to the present invention provided for a device for selective catalytic reduction of exhaust gases from internal combustion engines, for uniform distribution of reducing agent in the exhaust gas stream that is introduced into the exhaust gas stream at the catalyst inlet. The mixer comprises a structure of mixer elements through which the mixture of exhaust gas and reducing agent is to flow. The mixer elements are adapted for direct electrical heating with an electric current flowing through them due to their electrical resistance.

It is the particular approach of the present invention to provide a mixer for the supply of the exhaust gas stream mixed with reducing agent in an SCR catalyst which enables optimization of the conditions for the selective catalytic reaction. For this, the mixer elements configured for optimal distribution are additionally configured as resistance heating elements and directly heated by electricity. This makes it possible to achieve both optimal distribution of reducing agent across the catalyst surface as well as to prevent the formation of deposits or to independently again melt them off during the heating operation. Temperatures are additionally reached due to heat dissipation from the heated mixer to the exhaust gas flow downstream of the SCR catalyst which allow $NO_x$ reduction even at low exhaust gas temperatures, for example, after starting up or during coasting operation of a diesel engine. This is particularly desirable because exhaust emissions are the highest when engine temperatures are cold. When the engine is already hot, the exhaust gas temperatures are at about 600 to 900° C., so that the additional heating can also be dispensed with.

The mixer elements are preferably arranged in the form of turbine blades. Such an arrangement enables particularly efficient mixing (swirling) of the components of the exhaust gas and reducing agent mixture for the desired uniform distribution of the reducing agent in the exhaust gas stream.

According to a preferred embodiment, the structure of mixer elements is disposed substantially in a ring shape. This corresponds to a symmetrical arrangement relative to the axis of the exhaust gas stream. Such a structure furthermore in a particularly simple manner enables series connection of the individual mixer elements among each other, so that no complicated structure of wiring or contact points for power supply is required. The individual mixer elements are preferably electrically interconnected in series in the form of a heating circuit. Also preferably, the mixer elements are air-wheel-shaped, arranged partially overlapping in a staggered manner.

The reducing agent introduced into the exhaust gas stream preferably comprises an aqueous urea solution (in the field of automotive technology known as AdBlue). It can by multi-step thermolytic hydrolytic decomposition be transformed to the ammonia that is required for the catalytic reduction of nitrogen oxides. The hydrolysis step is there preferably enhanced by an additional hydrolysis catalyst. The hydrolysis catalyst can be applied in the form of a coating on the mixer elements. Alternatively or additionally, the hydrolysis catalyst can be arranged separately in the exhaust gas stream.

A supply of reducing agent in solid form is alternatively also possible, for example, as solid urea particles. In this case, it is further advantageous if a particulate filter is additionally located between the supply of reducing agent and the mixer, since it enhances uniform particle distribution.

The mixer elements are preferably made of a heating element alloy (heating resistor alloy) Suitable material is, for example, an alloy of chromium, iron and aluminum (Cr-FeAl). The direct production of the mixer elements from material that is suitable as a heating resistor enables a simple structure and ease of manufacture. The integral formation of the plurality of mixer elements connected in series is particularly preferred.

According to a preferred embodiment, the electrical contact to the power supply is effected via a pin which insulated by a connector is connected to the mixer. Current supply is preferably effected in a radial direction with respect to the exhaust gas stream. This has the advantage that a possible influence of the exhaust gas stream due to the supply of current is avoided. Alternatively, the current supply is preferably effected in the axial or coaxial direction relative to the exhaust gas stream. This has the advantage of a particularly space-saving implementation, since no components are needed projecting beyond the circumference of the mixer device in the radial direction.

The connection to ground is preferably effected by a pin which insulated via a connector is connected to the mixer. Alternatively, the connection to ground can also be effected without any special component being required for this. For this, components that are provided for fixation of the mixer elements are simultaneously used for the connection to ground.

The mixer elements are preferably furthermore also provided with tabs for fixation. The tabs are located in a positive-fit manner in insulation plates which in turn are held in pipe section flanges. In the case of such an embodiment, the connection to ground can be effected directly via pipes sections contacting ground.

More preferably, the stiffness of the mixer is increased by creases in the mixer elements. Also preferably, the insulation plates serving fixation are made of micanite (pressed mica).

According to a preferred embodiment of the present invention, the resistance of individual mixer elements varies. According thereto, for example, a specific mixer element has a different electrical resistance than another mixer element. The electrical resistance can there also vary within a single mixer element. The varying resistance leads to a respective voltage drop, and thus to increased heat output. The varying electrical resistance can be effected, for example, by reducing the effective cross section of the line. By adjusting the electrical resistance within a single mixer element, an increased amount of heat can then respectively be provided and dissipated, where increased heat dissipation to the fluid flowing through the mixer due to the flow conditions within the mixer is desired. On the other hand, by the electrical resistance being reduced relative thereto, in particular an outer edge region close to the housing of the mixer elements or also a mounting portion where a mixer element is secured on the housing side, less heating of this region can be effected. By varying the electrical resistance, the amount of heat dissipated can respectively then be spatially concentrated to those regions where the fluid to be heated predominantly flows. It can also by local distribution of heat dissipation within the mixer elements or relative to individual mixer elements be avoided that a housing supporting the mixer elements is excessively heated.

Further advantageous embodiments are the subject matter of dependent claims.

A device is further specified with the present invention for selective catalytic reduction of exhaust gases from a fuel combustion engine. This is in particular a fuel combustion engine in a motor vehicle. The device has an exhaust gas pipe leading to a mixer and a reducing agent pipe which is connected to a reservoir for a reducing agent. The reducing agent pipe the flow direction opens into the exhaust gas pipe upstream of the mixer. In the catalyst, the mixer is in the flow direction of the gas to be treated provided downstream.

This device comprises the mixer according to the invention according to one of the claims 1 to 14.

The reducing agent reservoir preferably contains aqueous urea solution as a reducing agent.

BRIEF DESCRIPTION OF THE DRAWINGS

The present invention is in the following explained with reference to preferred embodiments in combination with the accompanying drawings in which:

FIG. 4b shows a lateral view of the embodiment shown in FIG. 4a;

DETAILED DESCRIPTION

The following detailed description serves to illustrate the invention by means of selected embodiments and with reference to the drawings. However, the present invention as defined in the claims is not restricted to the embodiments described hereinafter.

Figure 1:
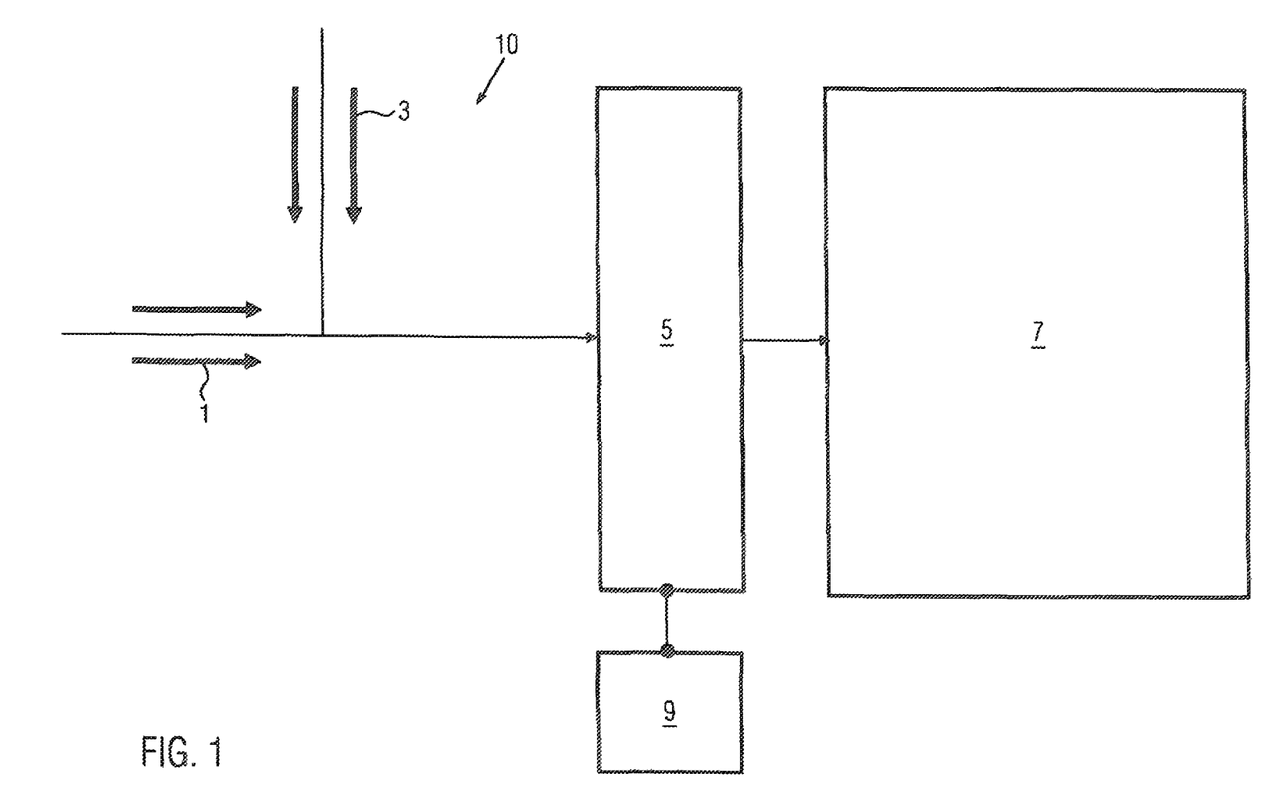
FIG. 1 shows an overview of the device for the after treatment of exhaust gases from an internal combustion engine in which a mixer according to the invention is employed.

FIG. 1 shows an overview diagram of a device 10 for selective catalytic reduction of exhaust gases according to one embodiment of the present invention. The exhaust gases of an internal combustion engine, for example a motor vehicle engine, are in this diagram illustrated in the form of exhaust gas stream 1 flowing from the left to the right. It is supplied reducing agent, preferably in the form of an aqueous urea solution, AdBlue. Aqueous urea solution 3 is in liquid form injected upstream of the SCR catalyst 7 into exhaust gas stream 1. The flow of the reducing agent 3 is in the diagram shown from the top to the bottom. The combined stream of exhaust gases and reducing agent flows through a mixer according to the present invention. It serves better distribution of the reducing agent in the exhaust gas stream. A detailed description of embodiments of a mixer according to the invention is given farther below with reference to the subsequent figures.

According to the present invention, mixer 5 is connected to a power supply 9 which enables directly electrically heating the mixer elements of the mixer. The stream of exhaust gases and reducing agent, well mixed in the mixer and heated, impacts the catalyst for selective catalytic reduction (SCR catalyst 7). The catalyst is preferably disposed on suitable support material so that a catalyst surface as large as possible is effective with respect to the mixture flowing through. This can be done, for example, with a honeycomb structure.

For catalytic enhancement of the decomposition of the urea added in an aqueous solution in order to obtain the ammonia required for the actual selective catalytic reaction, a hydrolysis catalyst (not shown) can further be provided preferably between mixer 5 and SCR catalyst 7. Alternatively, such a catalyst could also be provided on the path between the addition of reducing agent 3 and mixer 5. Finally, further alternatively, hydrolysis in the mixer itself can be enhanced by suitably coating the mixer elements with material that is suitable as a hydrolysis catalyst. Metal oxides are suitable as a hydrolysis catalyst, such as titanium dioxide or aluminum dioxide, silicon dioxide or zirconium dioxide. The mixer can in particular according to preferred embodiment have a coating which enhances both hydrolysis and the selective catalytic reaction. This can be done, for example, by a mixture of metal oxide mixtures with H-zeolite. The downstream SCR catalyst, in particular its catalytically active surface, can thereby be reduced in its size. Furthermore, the use of coated mixer elements has the advantage over a separate hydrolysis catalyst that no additional parts are required in addition to the mixer, which would increase the pressure loss in the exhaust gas stream.

Figure 2A:
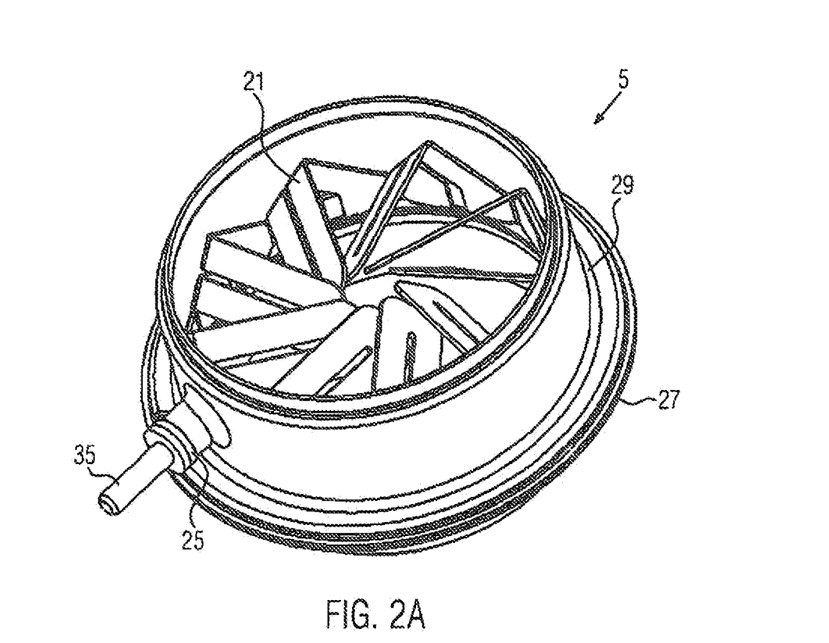
FIG. 2A shows a perspective overview of an embodiment of a mixer according to the invention.
Figure 2B:
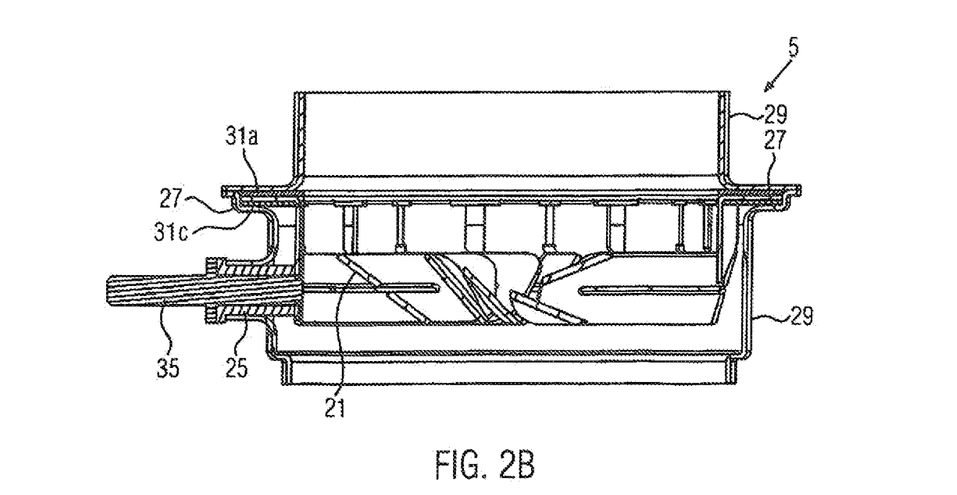
FIG. 2B shows a lateral view of the embodiment of FIG. 2A.

FIG. 2 shows a schematic diagram of a mixer 5 according to an embodiment of the present invention. FIG. 2A is a perspective view, from the perspective of the top view slightly slanted from above. FIG. 2B shows a section view in a lateral perspective.

Figure 4A:
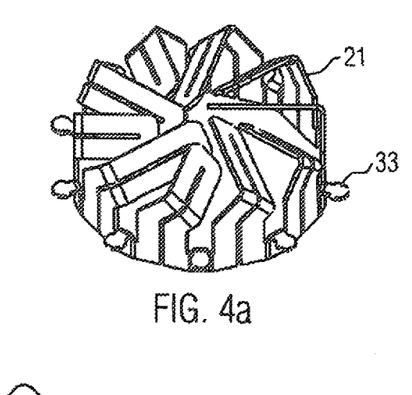
FIG. 4a shows a top perspective view of mixer elements arranged in a ring-shaped manner of a modification of the embodiment of the present invention shown in FIGS. 1 to 3.
Figure 4B:
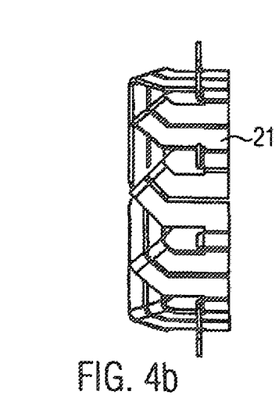
Figure 4C:
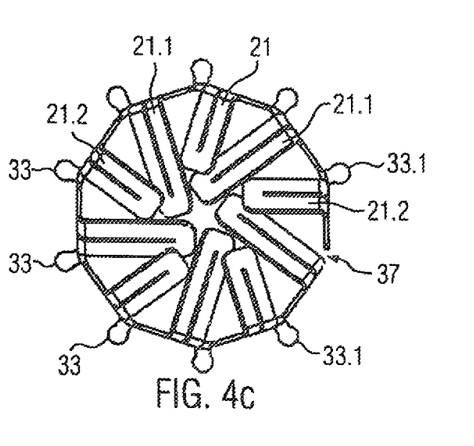
FIG. 4c shows a top view of the embodiment shown in FIGS. 4a and 4b.
Figure 4D:
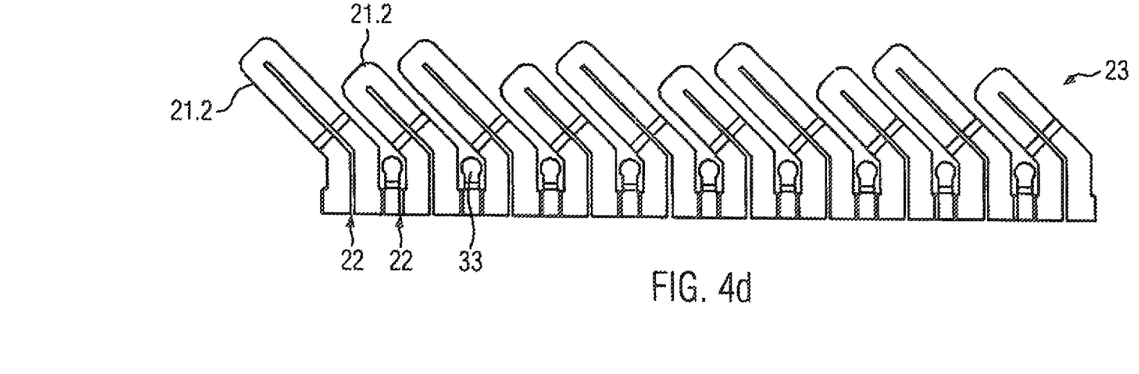
FIG. 4d shows a development of the embodiment illustrated in FIGS. 4a to 4c.

In the embodiment according to FIG. 2, mixer elements 21 have substantially the shape of a blade. The special structure of the mixer elements with a slot between the parts connected at the respective end of the blades results from the fact that the mixer elements must be suited for current flow and are for this to be fabricated from current-conducting material., preferably by bending and punching. Blade-shaped mixer elements 21 in the embodiment shown have a bevel of about 90° ("crease"). This is used for mechanical reinforcement of the mixer elements. The individual mixer elements 21 according to the embodiment shown are arranged in the form of a substantially ring-shaped structure. This structure, as shown in FIG. 2A, further preferably has the shape of an air wheel, i.e. in a top view (seen in the axial direction of the exhaust gas stream) there is a partial overlap of respectively adjacent mixer elements 21. As in particular FIGS. 4c and 4d illustrate, mixer elements 21 are formed by punching and bending from a single sheet metal strip 23. Alternatingly relatively longer mixer elements 21.1 and relatively shorter mixer elements 21.2 are formed in the longitudinal direction of sheet metal strip 23. Mixer elements 21 are accordingly part of a continuum. Tabs 33 are first cut out between individual mixer elements tabs 33 by punching and are during the bending process following the punching bent out from the plane of sheet metal strip 23. Each of the mixer elements 21 comprises a central groove 22 which each opens towards a lower edge of sheet metal strip 23. This results in a circuit track for electricity through which the current flow is passed meandering through sheet metal strip 23.

During the bending process of sheet metal strip 23, also the individual mixer elements 21 are bent in the radial inner direction while forming the aforementioned crease, whereas lateral tabs 33 are bent in the oppositely disposed, i.e. radially outer direction. Thereafter, the entire sheet metal strip 23 is bent to a ring shape so that the individual mixer elements 21 are in the radially inner region of the ring-shaped element superimposed in an air-wheel-like manner. As is evident, the smaller mixer elements 21.2 at least partially cover adjacent longer mixer elements 21.1. The front and rear ends of sheet metal strip 23 are provided at a distance from each other and leave open a separation 37. At the one end of sheet metal strip 23, a bore 24 is formed which is shown in FIG. 3 and which serves connecting to mixer elements 21 which shall below be explained in more detail.

Figure 3:
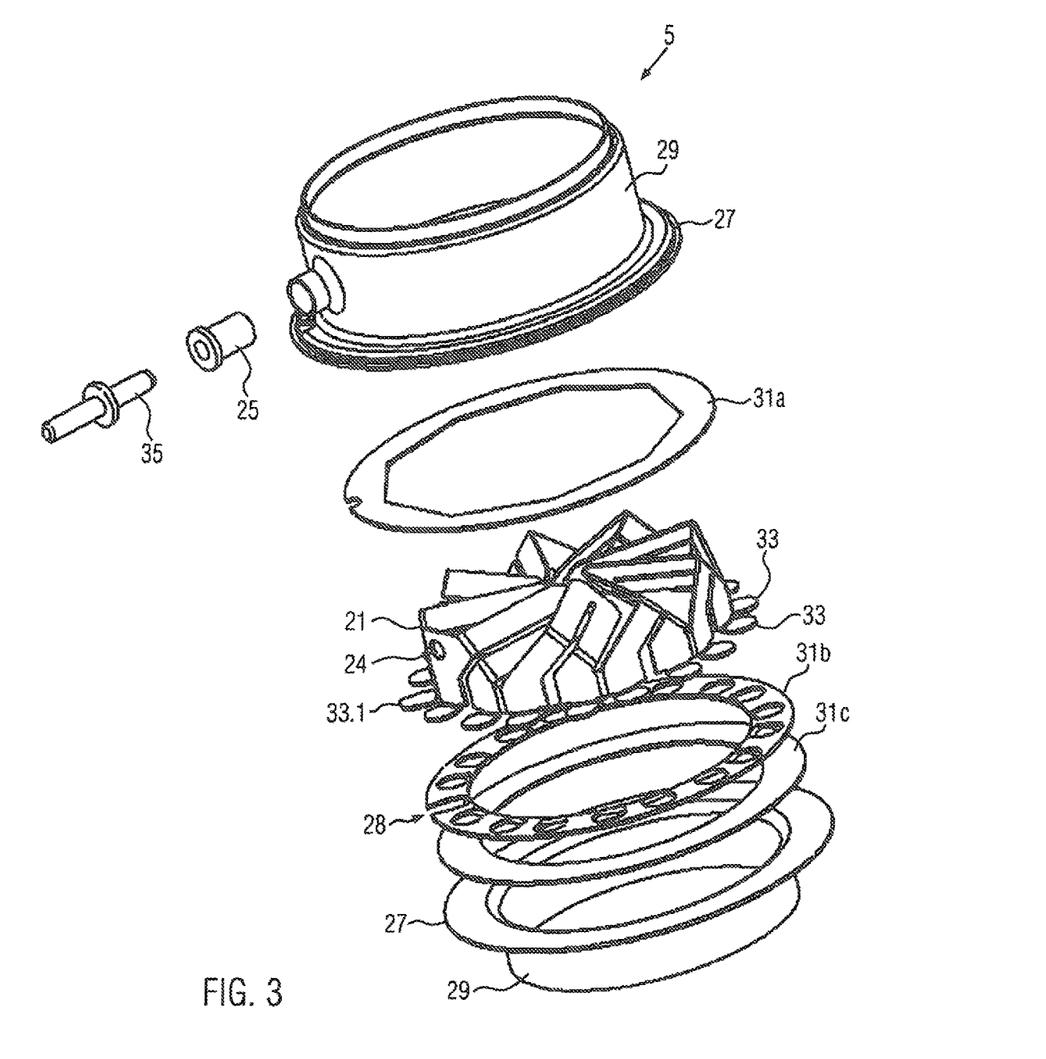
FIG. 3 shows an exploded view of an embodiment of a mixer according to the invention.

Due to the slanted position of mixer elements 21, in particular evident from FIGS. 3 and 4c, a sufficiently large clear opening for the exhaust gas and reducing agent mixture flowing through is obtained despite the air-wheel-like structure, so that the flow resistance does not become too large, whereby the pressure loss of the flowing gas in mixer 5 remains within limits. In the example shown, the power supply is effected via a 25 provided on the peripheral edge of the mixer structure. Pipe sections 29 preferably having a circular cross-section are provided as the outer end of the mixer structure. They have flanges 27 with which the entire mixer structure is held.

Further details of the structure of a mixer 5 according to an embodiment of the present invention can be gathered from the exploded view of the mixer shown in FIG. 3. The central element of mixer 5 is the air-wheel-shaped structure of the substantially blade-shaped mixer elements 21. This structure is preferably produced, punched and bent from a resistive alloy such as CrFeAl. Mixer elements 21 can further optionally comprise a catalytically active coating (not shown).

Previously-described tabs 33 are used to fix mixer elements 21 between pipe section flanges 27. These tabs 33 are arranged between outer insulation plates 31a, 31c. Three insulation plates 31 are shown in the exploded view of FIG. 3. An intermediate insulation plate 31b comprises recesses for positive-fit reception of tabs 33 (as well as a further recess in the region of the power supply). This intermediate insulation plate is held from above and below by two further ring-shaped insulation plates 31a, 31c. The insulation plates are according to a preferred embodiment manufactured from micanite (pressed mica). The insulation plates 31 in turn are held between pipe section flanges 27 which are formed by pipe sections 29. These pipe sections 29 form the outer peripheral end of the mixer structure. According to the embodiment illustrated, a power supply is provided in the radial direction. The electrical connection is there effected by a pin 35 which is held via a sleeve 25 in the upper pipe section 29 shown in FIG. 3 and fixedly connected to the ring-shaped structure of mixer elements 21. Pipe sections 29 substantially constitute the housing of the embodiment. The connection to ground is effected either via a second pin (not shown) or via a direct connection to the pipe sections contacting ground. It can be seen in the embodiment shown in FIG. 3 that the upper insulation plate 31*a* comprises a radial indentation 28 between respective last lateral tabs 33.1. A contact element can there be connected for electrically connecting upper pipe section 29 with this last tab 33. Between the respective last tabs 33.1, a separation 37 in the form of a slot is located between the free ends of sheet metal strip 23 bent to a ring shape. In addition to the pin extending radially to the exhaust gas pipe shown in the figures, axial or coaxial extensions are also conceivable.

As can be seen, bore 24 is relatively distant from the associated last tab 33 of the "first" mixer element 21. The voltage drop of bore 24 occurs in the leg extending radially inwardly of the associated first mixer element 21 which is particularly significant for heat dissipation. Moreover, active heating with an electric current flowing can in this region be avoided or at least greatly reduced by relatively low electrical resistance of that region extending between bore 24 and the associated last lateral tab 33.1. The corresponding last tab 33.1 thereby remains relatively cool, i.e. is not or only slightly heated. A respective measure can be taken for the remaining tabs. Low electrical resistance can be effected, for example, by an enlarged cable cross-section in this region, whereas the effective conductor cross-section within the radially extending legs of mixer 21 can be reduced. It can, for example, be continuously reduced from the outer diameter to the radially inner end of respective mixer elements 21, so that maximum heat dissipation to the radially inner tip of mixer element 21 results.

FIGS. 4*a* to 4*d* represent different views, shown by themselves, of mixer elements 21 or the ring-shaped structure formed from them. It is in particular evident from the top view of FIG. 4*c* that the ring structure at one point comprises separation 37 previously discussed for enabling current flow and thereby electric heating. FIG. 4D illustrates sheet metal strip 23 prior to being bent down, i.e. mixer elements 21 are illustrated linearly side by side, i.e. in a linear unrolled shape.

With regard to the required heating output, it is generally important that it is sufficient high to heat the mixture of exhaust gases and reducing agent flowing through even when the temperature of exhaust gases arriving from the engine are significantly lower, for example, after start-up or during coasting operation of a diesel engine, such that no deposits form on the mixer elements or they are again melted off, respectively, and preferably the optimal reaction temperature in the range of approximately 200° C. to 350° C. or higher can be achieved in the region of the downstream SCR catalyst 7. The operating voltage is determined by the voltage in the vehicle electrical system (conventionally preferably 12V (volts)). Depending on the requirements in the respective field of employment of the mixer, however, other operating voltages are possible For a given operating voltage, the power can be varied by the cross-section and the overall length through the heat circuits formed in the mixer elements (when imagined in unrolled, stretched form).

The following specific embodiment is given only by way of example: A heat conductor is used having a specific resistivity of 1.4 ohm mm$^2$ m$^{-1}$, a stretched length of 800 mm (millimeters) and a cross-section of 6 mm$^2$. The diameter of the mixer 5 bent to a ring shape is there approximately 63 mm. In such an embodiment, the performance at a voltage applied of 12V is at about 750 W (watts).

In summary, the present invention relates to a device 2 for selective catalytic reduction of exhaust gases from internal combustion engines, for uniform distribution of a reducing agent 3 in the exhaust gas stream 1 that is introduced into the exhaust gas stream 1 at the catalyst inlet, wherein the mixer comprises a structure of mixer elements 21 through which the mixture of exhaust gas 1 and reducing agent 3 is to flow In order to prevent the deposit of reducing agents on the mixer and to enable an optimal temperature for the subsequent SCR reaction, it is with the present invention proposed to design mixer elements 21 to have an electric current flowing through them for electrical heating due to the electrical resistance thereof. The invention in particular relates to a directly electrically heatable mixer 5 for a system for selective catalytic reduction of exhaust gases from an internal combustion engine, for example, an automobile engine. A very high degree of efficiency in relation to the power used can be achieved by direct heating. Heat is dissipated at locations at which the heat is needed. The structure as a whole can be configured in a very cost-effective manner. The invention further relates to a device for selective catalytic reaction of exhaust gases from an internal combustion engine having an exhaust gas pipe leading to a mixer according to the invention and having a reducing agent pipe which is connected to a reservoir for reducing agent and which in the flow direction opens into the exhaust gas pipe upstream of the mixer 5, and a catalyst 7 in the flow direction downstream of the mixer 5.

The invention claimed is:

1. A mixer for a device for selective catalytic reduction of exhaust gases from internal combustion engines, for uniform distribution of a reducing agent in the exhaust gas stream that is introduced into said exhaust gas stream at the catalyst inlet, wherein said mixer comprises:
    a structure of mixer elements through which the mixture of exhaust gas and reducing agent is configured to flow,
    wherein said mixer elements are adapted for direct electrical heating with an electric current flowing through them due to their electrical resistance, and
    wherein said mixer elements are provided with tabs that are received between insulation plates that are held between pipe section flanges of pipe sections of a housing of said mixer.

2. A mixer according to claim 1, wherein individual mixer elements are electrically interconnected in series so as to form a heating circuit.

3. A mixer according to claim 1, wherein said mixer elements comprise a heating element alloy.

4. A mixer according to claim 1, wherein an electrical contact to said mixer to a power supply is effected via a pin which is insulated by a sleeve is connected to a housing of said mixer.

5. A mixer according to claim 1, wherein a power supply to said mixer is effected in a radial direction relative to said exhaust gas stream.

6. A mixer according to claim 1, wherein a power supply to said mixer is effected in an axial or a coaxial direction relative to said exhaust gas stream.

7. A mixer according to claim 1, wherein a connection to ground is effected via a pin which is insulated by a sleeve is connected to a housing of said mixer.

8. A mixer according to claim 1, wherein a connection to ground is effected via a pipe section contacting ground of a housing of said mixer.

9. A mixer according to claim 1, wherein said mixer elements are produced from a sheet metal strip by punching and bending, and wherein said sheet metal strip comprising said mixer elements is bent to a ring shape.

10. A mixer according to claim 1, wherein said mixer elements are provided with creases that enhance mechanical rigidity.

11. A mixer according to claim 1, wherein said insulation plates comprise micanite.

12. A mixer according to claim 1, wherein the electrical resistance of individual mixer elements varies.

13. A mixer for a device for selective catalytic reduction of exhaust gases from internal combustion engines, for uniform distribution of a reducing agent in the exhaust gas stream that is introduced into said exhaust gas stream at the catalyst inlet, wherein said mixer comprises:
   a structure of mixer elements through which the mixture of exhaust gas and reducing agent is configured to flow, wherein said mixer elements are adapted for direct electrical heating with an electric current flowing through them due to their electrical resistance, wherein said mixer elements are produced from a sheet metal strip by punching and bending, wherein said sheet metal strip comprising said mixer elements is bent to a ring shape and rear ends of said sheet metal strip are provided at a distance from each other and leave open a separation, and wherein each of said mixer elements comprises a central groove which each opens towards a lower edge of said sheet metal strip, thereby forming a circuit track for electricity through which current flow is passed meandering through said sheet metal strip.

14. A mixer according to claim 13, wherein said mixer elements have the shape of turbine blades.

15. A mixer for a device for selective catalytic reduction of exhaust gases from internal combustion engines, for uniform distribution of a reducing agent in the exhaust gas stream that is introduced into said exhaust gas stream at the catalyst inlet, wherein said mixer comprises:
   a structure of mixer elements through which the mixture of exhaust gas and reducing agent is configured to flow, wherein
   said mixer elements are adapted for direct electrical heating with an electric current flowing through them due to their electrical resistance,
   wherein said structure of mixer elements is arranged substantially ring-shaped,
   wherein individual mixer elements are electrically interconnected in series so as to form a heating circuit, and
   wherein an electrical contact to said mixer to a power supply is effected via a pin which is insulated by a sleeve is connected to a housing of said mixer.

16. A mixer according to claim 1, wherein said mixer elements have the shape of turbine blades.

17. A mixer according to claim 1, wherein said structure of mixer elements is arranged substantially ring-shaped.

* * * * *